United States Patent [19]

Stern et al.

[11] Patent Number: 4,543,837
[45] Date of Patent: Oct. 1, 1985

[54] LOAD CELL TEMPERATURE COMPENSATION SYSTEM

[75] Inventors: Mark Stern; Charles Airesman; Vijay Pandit, all of Cumberland, Md.

[73] Assignee: Allegany Technology, Inc., Cumberland, Md.

[21] Appl. No.: 603,838

[22] Filed: Apr. 25, 1984

[51] Int. Cl.$^4$ .............................................. G01L 1/22
[52] U.S. Cl. .................................. 73/862.63; 73/781; 73/862.66; 338/6
[58] Field of Search ...................... 73/862.63, 781, 782, 73/862.66; 338/6, 3; 33/147 D, 148 D

[56] References Cited

U.S. PATENT DOCUMENTS

| | | | |
|---|---|---|---|
| 2,633,019 | 3/1953 | Albrecht et al. | 73/781 |
| 3,199,345 | 8/1965 | Lee et al. | 73/862.63 |
| 3,241,359 | 3/1966 | Glerum | 73/862.63 |
| 3,864,966 | 2/1975 | Seitz | 73/862.63 |
| 4,364,279 | 12/1982 | Stern et al. | 73/862.66 |

Primary Examiner—Donald O. Woodiel
Attorney, Agent, or Firm—Morton J. Rosenberg

[57] ABSTRACT

A load cell temperature compensation system (10) for accurately measuring a force load applied to an external member (18) during environmentally varying temperature values. The load cell temperature compensation system (10) includes a standard load cell (12) which is rigidly mounted on a load cell mounting plate (20). The load cell mounting plate (20) is fixedly secured to the external member (18) which has an external force load applied thereto. The temperature compensation system (10) further includes a force load application mechanism (40) which transmits a predetermined force load to the load cell (12) responsive to the external force load applied to the external member (18). A mechanism for maintaining a constant reference load force (60) is provided to maintain a substantially constant reference load force on the load cell (12) independent of temperature variations applied to the external member (18). In this manner, temperature variations applied to the external member (18) will be compensated for by compensation system (10) and not read as a load force applied to the external member (18).

24 Claims, 8 Drawing Figures

LOAD CELL TEMPERATURE COMPENSATION SYSTEM

BACKGROUND OF THE INVENTION

1. Field of the Invention

This invention is related to mechanisms which compensate for temperature varying load cell inaccuracies. In particular, this invention directs itself to a load cell system mounted on an external member to which is applied a force load. More in particular, this invention relates to a mechanism for maintaining a substantially constant reference load force on the load cell independent of temperature variations applied to the external member. Further, this invention directs itself to a load cell temperature compensation system which allows for expansion or contraction of load measuring elements in a predetermined manner to relieve the load cell of inaccuracies associated with temperature variation.

2. Prior Art

Temperature compensation systems are known in the prior art. The best prior art known to the inventors include U.S. Pat. Nos. 3,241,359; 3,864,966; 2,930,227; 2,298,216; 4,325,048; 2,357,356; 3,290,928; 3,351,880; 3,341,796; 3,290,931; 3,171,276; 3,108,470; 2,531,414; and, 3,577,779.

U.S. Pat. No. 3,241,359 is directed to a thermally balanced load cell device. The load cell of this Patent has a predetermined structure to minimize thermal errors resulting from a change in temperature. Although this Patent does recognize the problem areas associated with temperature changes in load cells, it does not provide for a mounting system adaptable to a slave type load cell as is provided in the subject invention concept.

U.S. Pat. No. 3,864,966 is directed to a load transducer which compensates for temperature variance. Both the load member and the thermal compensation bar in this Patent are generally constructed of the identical materials in order to reduce thermal variance errors. Once again, this does provide for the general recognition of the problem of temperature variance, however, it does not provide for the mounting mechanism adaptable to load cells of the subject invention concept.

In many prior art load sensing devices which are used for determining the load applied to the end of a boom crane, have proven substantially unreliable and generally provide for load measuring inaccuracies due to temperature induced errors. In some of the prior art crane load sensing devices, such inaccuracies in some cases have merely been treated by downgrading the capacity of the crane to insure safe margins of operation for the lifting capabilities of the crane systems. However, the mere downgrading of the capacity of the crane systems does not provide for an accurate determination of the force loads applied.

The use of slave load cells for measuring deflections by mechanically entrapping a particular load cell between two reference points of a load bearing structure has a number of advantages which include, but are not limited to, the ease of attachment of such slave loading cell systems to existing hydraulic cylinder rods. In general, such slave load cell systems may be bolted directly on the hydraulic cylinder rods at two places, with the load sensing element between the two points of mounting. However, prior art systems directed to temperature compensation of such load sensing systems were not attainable, due to the effects of varying temperatures and the difference in temperatures and the coefficients of expansion between the load sensing elements and the hydraulic cylinder rods.

SUMMARY OF THE INVENTION

A load cell temperature compensation system which includes a load cell and a load cell mounting plate member which is fixedly secured to a shaft member. The shaft member is adapted to have an external force load applied thereto and the load cell is fixedly secured to the load cell mounting plate member. A mechanism for applying a force load to the load cell is provided and is responsive to the external force load applied to the shaft member. A mechanism for maintaining a substantially constant reference load force on the load cell which is independent of temperature variations applied to the shaft member is used to compensate for any temperature differences and different coefficients of expansion between the shaft member and the load cell temperature compensation system.

DESCRIPTION OF THE PREFERRED EMBODIMENTS

Referring now to FIGS. 1-4, there is shown load cell temperature compensation system 10 for negating load reading errors associated with temperature variations experienced by the body element whose force load is being measured. In overall concept, load cell temperature compensation system 10 is applied to load cell 12 which is mounted between a pair of reference points on a load bearing structure. In this particular type of mounting, as will be detailed in following paragraphs, a mounting of this type is commonly known in the art as a "slave load cell".

Slave load cell mountings have a number of advantages associated with their ease of mounting, however, in many areas, disadvantages arise from temperature errors when the load bearing structure is subjected to temperature variations. In this type of a mounting, load cell 12 is fixedly secured between a pair of reference points on the load bearing structure, and with a variation of temperature applied both to load cell 12 and the load bearing structure, such may indicate a change in a force load where no force load variation has taken place. As is well known, a variation in temperature will cause a displacement or deformation of the body experiencing the temperature variation, and load cell 12 may record a change which is proportional to the amount of such displacement when temperature variations are provided between the reference points. Due to this fact, the use of slave load cell mountings has been minimized in a number of previous applications wherein temperature compensation of such loading systems have not been provided.

Load cell 12 as herein discussed, may be identical or similar to the shear beam load cell shown and described in U.S. Pat. No. 4,364,279 issued to the same Assignee. U.S. Pat. No. 4,364,279 is hereby incorporated by reference into this Specification.

Figure 1:
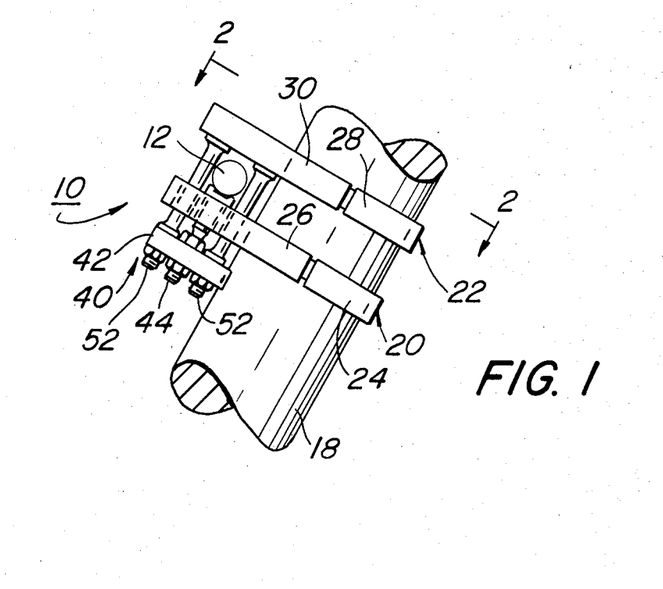
FIG. 1 is an elevational view partially cut-away of the load cell temperature compensation system applied to a crane.

Referring now to FIG. 1, there is shown, load cell temperature compensation system 10 rigidly secured to shaft member 18. It is the object and purpose of load cell 12 to accurately measure the loads applied to a bearing structure in order that the structural integrity of load bearing structure is insured at all times. However, it is to be understood that load cell temperature compensation system 10, may be used for a crane type load bearing structure, such is provided for illustrative purposes only, and load cell temperature compensation system 10 including slave mounted load cell 12 may be applied to other structural members, whose temperature environment will cause temperature induced load measurement errors.

Figure 2:
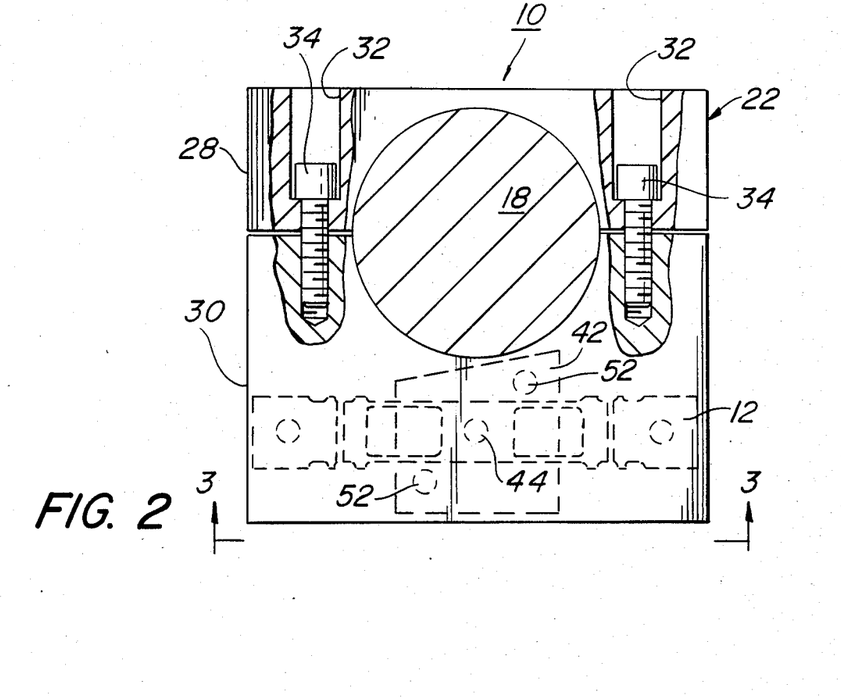
FIG. 2 is a sectional view of the temperature compensation system partially in cut-away, taken along the Section Line 2—2 of FIG. 1.

Load cell temperature compensation system 10 includes load cell mounting plate 20 and bottom plate 22 which are both fixedly secured to shaft member 18 of load bearing structure 18. Load cell mounting plate member 20 may include a pair of mounting plate securement members 24 and 26 which encompass and interface with shaft member 18. Similarly, bottom plate member 22 shown in FIGS. 1 and 2, may include bottom plate securement members 28 and 30 which also substantially encircle and are mounted to shaft 18 in a similar manner when taken with respect to load cell mounting plate 20. One form of securement is shown in FIG. 2 wherein bottom plate securement member 28 includes recessed openings 32 within which there is mounted securement bolts 34 for threadedly securing bottom plate securement members 28 and 30, each to the other, and in tightened relation with respect to shaft member 18. An identical securement mechanism may be provided for load cell mounting plate 20 to provide fixed reference connections to shaft member 18. It is to be understood that other types of securements may be attained for plate members 20 and 22, such as welding, fixed inserts into shaft member 18, or other like fixed securement mechanisms, not important to the inventive concept as herein described.

Figures 3, 4:
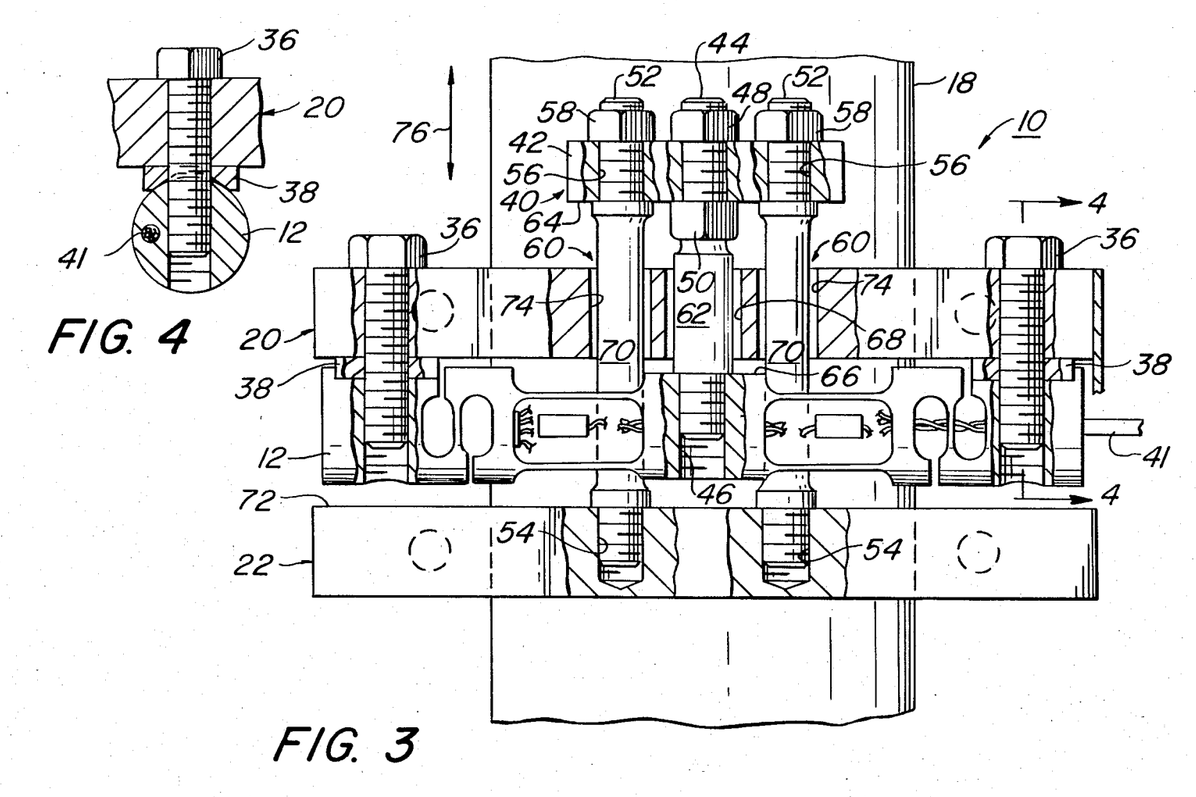
FIG. 3 is a sectional view of the load cell temperature compensation system partially in cut-away, taken along the Section Line 3—3 of FIG. 2.
FIG. 4 is a sectional view of a load cell mounting plate taken along the Section Line 4—4 of FIG. 3.
Figure 5:
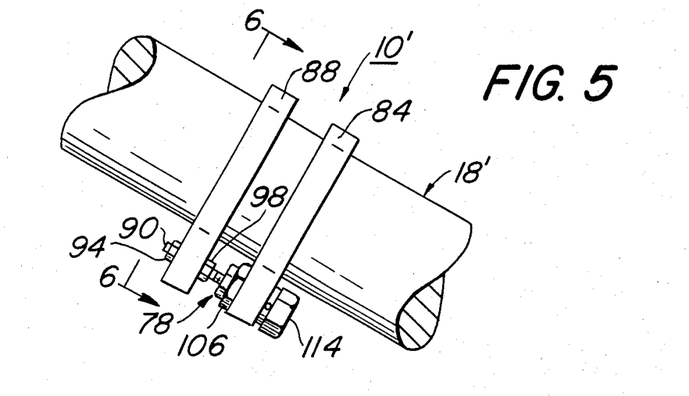
FIG. 5 is an elevational view of an embodiment of the load cell temperature compensation system applied to a crane boom.
Figure 6:
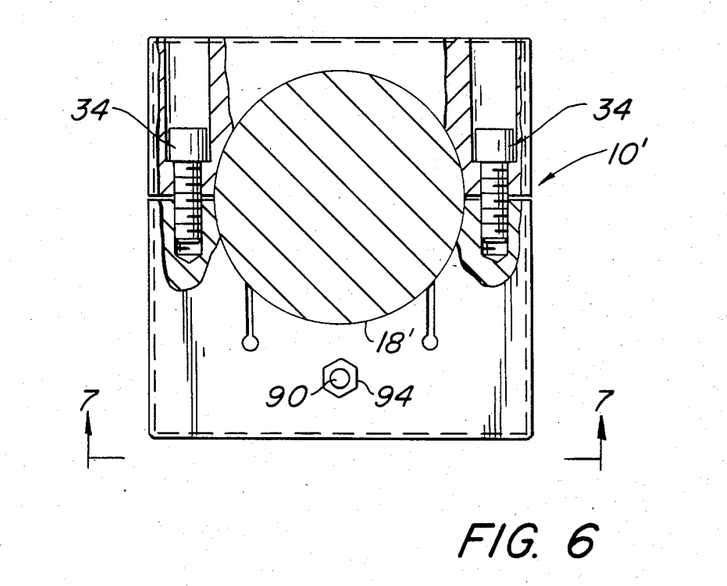
FIG. 6 is a sectional view of the embodiment of the load cell temperature compensation system taken along the Section Line 6—6 of FIG. 5.

Load cell temperature compensation system 10 includes load cell mounting plate member 20 fixedly secured to shaft member 18 which is adapted to have an external force load applied thereto. As is seen in FIGS. 3 and 4, load cell 12 is fixedly secured to load cell mounting plate member 20 by threaded securement of a pair of load cell mounting bolts 36 threadedly secured to load cell mounting plate member 20 and opposing ends of load cell 12. Due to the differing contours of load cell 12 and load cell mounting plate 20, load cell shoe members 38 are sandwiched between load cell 12 and a lower surface of mounting plate 20. In this manner, the generally circular cross-sectional contour of load cell 12 is adapted to be interfaced with the substantially planar lower surface of load cell mounting member 20. Additionally, load cell 12 includes cable members 41 extending from the overall housing of load cell 12 to external systems for reading the loads measured by load cell 12.

Referring now to FIGS. 1 and 3, there is shown force load application mechanism 40 for applying a force load to be measured to load cell 12 which is responsive to an external force load being applied to shaft member 18. Obviously, the external force load in the illustration shown in FIG. 1 would be applied to hook member 16 which would transmit a responsive force loading to shaft member 18, which may then be measured by load cell 12.

Force load application mechanism 40 which provides for the means of applying a force loading to load cell 12, includes common plate member 42 rigidly secured to load cell 12. Common plate member 42 is seen to be mounted above load cell mounting plate 20 in FIG. 3, and does not interface with shaft member 18, but is displaced therefrom and not secured thereto. The displacement of common plate member 42 from shaft member 18 is seen in FIG. 2.

Common plate member 42 is rigidly secured to load cell 12 through loading bolt member 44 which is threadedly secured to common plate member 42 and load cell 12 on opposing ends thereof. As can be seen by the cut-away view shown in FIG. 3, loading bolt member 44 is threadedly secured to load cell 12 by mating interface of loading bolt member 44 with load cell threaded section 46. Additionally, loading bolt member 44 may be maintained in secured relation to common plate member 42 by threaded loading bolt nut members 48 and 50.

Additionally, force load application mechanism 40 includes bottom plate member 22 which is fixedly secured to shaft member 18.

A pair of load coupling members 52 are secured on opposing ends thereof to bottom plate 22 and common plate member 42. Load coupling members 52 may be threaded bolts secured to bottom plate member threaded sections 54 and passing through common plate openings 56. Load coupling members 52 may merely be threaded bolt members which are secured to common plate member 42 on a top surface thereof by load coupling nut members 58.

In this manner, loading bolt member 44 as well as load coupling members 52 extend through load cell mounting plate member 20 in a manner to be further described in following paragraphs, and are coupled to both common plate member 42 and bottom plate member 22 in fixed securement. It is thus seen that load cell 12 is rigidly secured to common plate member 42 which in turn is rigidly secured to bottom plate member 22. Since load cell 12 is also rigidly secured to load cell mounting plate 20, external forces applied to shaft member 18 will then be transmitted to load cell 12.

For purposes of reading load measurements on shaft member 18, bottom plate member 22 is seen to be displaced from load cell mounting plate member 20 and load cell 12 may be mounted therebetween in threaded securement to load cell mounting plate 20.

For purposes of ease of analysis to be shown in following paragraphs, bottom plate member 22, load cell mounting plate member 20, common plate member 42, and load coupling members 44, 52 and 36, may be formed of identical metal composition elements wherein the metallic composition may be a stainless steel, or some like composition having known thermal coefficients of expansion. Although it is preferred to maintain as much of load cell temperature compensation system 10 compositions of the same material, such is not necessary to the inventive concept as is herein described.

Load cell temperature compensation system further includes constant reference load force mechanism 60 for maintaining a substantially constant reference load force on load cell 12 independent of temperature variations applied to shaft member 18 and other components associated with load cell temperature compensation system 10. Mechanism 60 acts in conjunction with force load application mechanism 40 to provide an accurate and repeatable reference load force on load cell 12 which compensates for any temperature variations as a function of time and/or positional locations of compensation system 10 on shaft member 18.

As can be seen in FIG. 3, constant reference load force mechanism 60 includes loading bolt collar member 62 which surrounds loading bolt member 44 and is captured between common plate lower surface 64 and load cell upper surface 66. Loading bolt collar member 62 has an external diameter greater than load cell threaded section 46 and extends through loading bolt passage 68, as is shown. The external diameter of loading bolt collar member 62 is substantially less than the internal diameter of loading bolt passage 68 in order to provide free extension therethrough. The composition and length of loading bolt collar member 62 is of importance, as will be shown in following paragraphs, when taken with relation to other elements of constant reference load force mechanism 60.

Constant reference load force mechanism 60 further includes load coupling collar members 70 which extend and are contiguously interfaced with common plate lower surface 64 and bottom plate upper surface 72. Each of load coupling collar members 70 surround load coupling members 52 and are thus captured between common plate lower surface 64 and bottom plate member upper surface 72, as is shown in FIG. 3. Coupling member openings 74 extend through load cell mounting plate 20 and include a diameter which is greater than each of load coupling collar members 70 to allow free passage therethrough of collar members 70. As was the case in loading bolt collar member 62, the composition and extended length of load coupling collar members 70 are of importance to the overall mechanism 60 for maintaining constant reference load forces. Load coupling collar members 70 may be slidably received on load coupling members 52, with the important consideration that each of load coupling collar members 70 bear in contact relation with surfaces 64 and 72.

Each of collar members 62 and 70 have an extended length depicted and defined by directional arrow 76, shown in FIGS. 3 and 4. Both of the collar members 62 and 70 are formed of inter-related predetermined material compositions and include extended predetermined lengths in direction 76 to provide a substantially equal change in length responsive to temperature variations seen by system 10. Each of the pair of collar members 70 and collar member 62 will respond to temperature changes in accordance with the well-known formula:

$$\Delta l = \alpha l \Delta T \tag{1}$$

where:

$\Delta l$ = member change of length in direction 76 -cm.-

$\alpha$ = temperature coefficient of expansion for member -°C$^{-1}$-

$l$ = unexpanded length of member at a reference temperature -cm.-

$\Delta T$ = change of temperature -°C.-

For a particular change of temperature experienced by system 10, it is required that members 70 and 62 expand by the same length in order to maintain a reference force on load cell 12. Thus, it is required that the change of length of members 62 and 70 should follow the formula:

$$\Delta l_{70} = \Delta l_{62} \tag{2}$$

where: $\Delta l_{70}$ = change of length of collar members 70 -cm.-

$\Delta l_{62}$ = change of length of collar member 62 -cm.-

In order to satisfy this equation, it is clearly seen that the temperature coefficients of expansion and lengths of collar members 70 and 62 should be inter-related in the following manner:

$$\alpha_{70}/\alpha_{62} = l_{62}/l_{70} \tag{3}$$

where:

$\alpha_{70}$ = temperature coefficient of expansion of collar members 70 -°C$^{-1}$-

$\alpha_{62}$ = temperature coefficient of expansion of collar member 62 -°C$^{-1}$ $l_{62}$ = length of collar member 62 at a reference temperature -cm.-

$l_{70}$ = length of collar member 70 at a reference temperature -cm.-

Thus, the inter-relation of the temperature coefficients and the unexpanded temperature lengths of collars 62 and 70 when satisfying equation 3 as previously shown, will allow a substantially constant reference force being applied to load cell 12 irrespective of temperature variations experienced by system 10.

Figure 7:
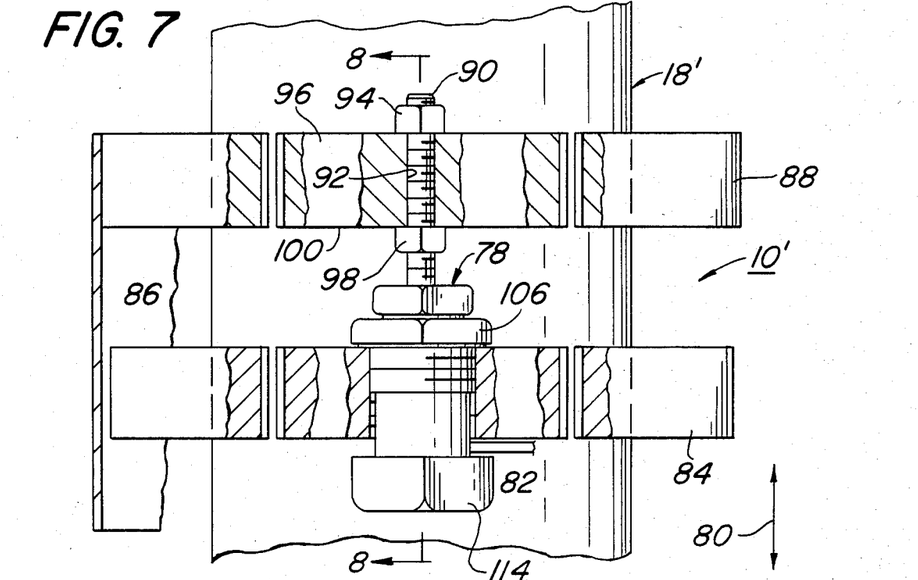
FIG. 7 is a sectional view of the embodiment of the load cell temperature compensation system taken along the Section Line 7—7 of FIG. 6; and, FIG. 8 is a sectional view of the embodiment of the load cell temperature compensation system taken along the Section Line 8—8 of FIG. 7.
Figure 8:
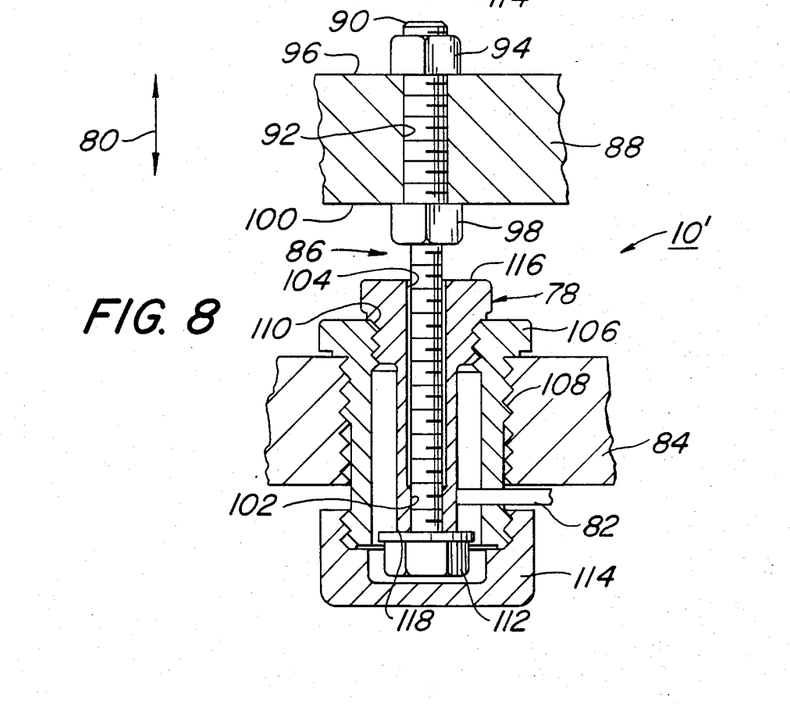

Referring now to FIGS. 7 and 8, there is shown an embodiment of load cell temperature compensation system 10, designated in following paragraphs by the element number 10'. Load cell temperature compensation system 10' includes hollow shaft load cell 78 having a predetermined extended length in a direction defined by directional arrows 80. Hollow shaft load cell 78 may be of a material composition having a predetermined temperature coefficient of expansion which is important to load cell temperature compensation system 10', due to the fact that hollow shaft load cells 78 becomes one of the temperature control expansion members of this embodiment.

In overall concept, hollow shaft load cell 78 as formed is a commercially available load cell member having a modified wheatstone bridge coupling contained therein, however, not important to the inventive concept, as is herein described. Hollow shaft load cell 78 further includes cable member 82 for passing electrical signals external to load cell temperature compensation system 10', as is known in the prior art. As is clearly seen in FIG. 7, load cell temperature compensation system 10' is coupled to either shaft member 18', or some other base surface, much in the manner as has previously been described for load cell temperature compensation system 10.

Load cell temperature compensation 10' includes load cell mounting plate member 84 which is secured to external shaft 18' or an external base member which is adapted to have some external force load applied thereto. Load cell 78 is fixedly secured to load cell mounting plate member 84 in a manner to be described in following paragraphs.

Load cell temperature compensation system 10' further includes force load application mechanism 86, for applying a force load to load cell 78 responsive to the external force load applied to base member 18'. Force load application mechanism 86 in overall concept has a predetermined length in direction 80 and a predetermined temperature coefficient of expansion for maintaining a substantially constant reference load force on hollow shaft load cell 78, independent of temperature variations applied to base member 18'.

Force load application mechanism 86 includes loading plate member 88 which is rigidly secured to base member 18' through bolts, threaded securement, or some like technique, not important to the inventive concept as is herein described. Additionally, loading plate member 88 may be formed of a metallic composition, such as stainless steel, or some like material composition. As can be seen in FIGS. 7 and 8, force load application mechanism 86 further includes loading bolt member 90 which is fixedly secured to loading plate member 88 and load cell 78.

Loading bolt member 90 passes through passage 92 formed through loading plate member 88. Additionally, upper nut member 94 threadedly engages loading bolt member 90 adjacent upper surface 96 of loading plate member 88. Similarly, lower nut member 98 engages loading bolt member 90 adjacent loading plate member lower surface 100, as is clearly seen. Upper and lower nut members 94 and 98, respectively, acting through loading bolt member 90, may provide for applying a pre-load and/or adjustment load to hollow shaft load cell 78, dependent upon the general requirements and external conditions found by a user.

As has been stated, both loading plate member 88 and load cell mounting plate member 84 are displaced each from the other in direction 80, as is shown in FIGS. 7 and 8. Additionally, load cell 78 is mounted between loading plate member 88 and load cell mounting plate member 84 in constrained relation thereto. Loading bolt member 90 is threadedly secured to loading plate member 88 on one end thereof, and is secured to load cell 78 in constrained relation thereto at section 102 shown in FIG. 8. Hollow shaft load cell 78 includes load cell passage 104, shown in FIG. 8, which extends through load cell 78 and has a diameter greater than the diameter of loading bolt member 90. In this manner, loading bolt member 90 does not interface with the internal walls of load cell passage 104 throughout at least a portion of the extension of load cell 78 in direction 80. However, loading bolt member 90 is secured to load cell 78 at loading bolt member end 102, as is shown. Securement may be through threaded securement of load cell 78 and loading bolt member 90, or in the alternative, may be fixedly secured through welding, or some like constrained securement mechanism.

Thermal isolation member 106 is removably secured to load cell 78 and load cell mounting plate member 84 for providing isolation and thermal insulation for load cell 78 from load cell mounting plate member 84. As can be seen, isolation member 106 is threadedly secured to load cell mounting plate member 84 at external threaded section 108 and is threaded to load cell 78 in threaded section 110. In this manner, isolation member 106 is clearly seen to be sandwiched in constrained relation between hollow shaft load cell 78 and load cell mounting plate member 84. In order to provide thermal insulation, thermal isolation member 106 generally is formed of a composition having a thermal conductivity less than the thermal conductivity of load cell 78 and load cell mounting plate member 84. Thus, load cell 78 has temperature variations substantially independent of temperature variations applied to load cell mounting plate member 84. Additionally, as has been previously described, load cell passage 104 includes a diameter substantially greater than the diameter of loading bolt member 90 to provide an air or other environment insulation interface between loading cell 78 and loading bolt member 90 throughout an extended portion of the extended length of load cell 78 in direction 80.

Cap member 112 is threadedly secured to loading bolt member 90 at loading bolt member end 102 adjacent a lower section end of loading cell 78. Additionally, isolation cap member 114 is seen to be threadedly secured to thermal isolation member 106 to provide further thermal isolation to load cell 78 from external environment varying temperature conditions.

In order to provide for appropriate temperature compensation for load cell temperature compensation system 10, an inter-relation of material composition and extended length for loading bolt 90 and load cell 78 are provided to allow an equal length extension or contraction upon temperature variations in the external environment. The extended length under consideration for load cell 78 is in direction 80, and extends from upper surface 116 to lower surface 118. The extended length under consideration for loading bolt member 90 extends between the lower surface of lower nut member 98 and the lower surface of loading bolt member 90, which is substantially coincident with load cell lower surface 118. In order to maintain the same or substantially the same extended length during varying temperature considerations, loading bolt member 90 and load cell 78 are inter-related in composition and in extended length substantially in accordance with the formula:

$$\alpha_{90}/\alpha_{78} = l_{78}/l_{90} \qquad (4)$$

where:

$\alpha_{90}$ = temperature coefficient of expansion of loading bolt member 90

$\alpha_{78}$ = temperature coefficient of expansion of load cell 78

$l_{78}$ = extended length of load cell 78

$l_{90}$ = extended length of loading bolt member 90

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended Claims.

What is claimed is:

1. A load cell temperature compensation system comprising:

(a) a load cell;

(b) a load cell mounting plate member fixedly secured to a shaft member adapted to have an external force load applied thereto, said load cell being fixedly secured to said load cell mounting plate member;

(c) means for applying a force load to said load cell responsive to said external force load applied to said shaft member, said means for applying said force load including a common plate member rigidly secured to said load cell and a bottom plate member fixedly secured to said shaft member, said bottom plate member being secured to said common plate member;

(d) means for maintaining a substantially constant reference force load on said load cell independent of temperature variations applied to said shaft member.

2. The load cell temperature compensation system as recited in claim 1 where said bottom plate member is displaced from said load cell mounting plate member.

3. The load cell temperature compensation system as recited in claim 1 where said load cell is mounted between said load cell mounting plate member and said bottom plate member.

4. The load cell temperature compensation system as recited in claim 1 where said means for applying said force load includes a loading bolt member secured on opposing ends thereof to said common plate member and said load cell respectively.

5. The load cell temperature compensation system as recited in claim 4 where said loading bolt member is threadedly secured to said common plate member and said load cell.

6. The load cell temperature compensation system as recited in claim 4 where said means for applying said force load includes at least one load coupling member secured on opposing ends thereof to said bottom plate member and said common plate member.

7. The load cell temperature compensation system as recited in claim 6 where said load coupling member is a load coupling bolt member threadedly secured to said bottom plate member and said common plate member.

8. The load cell temperature compensation system as recited in claim 6 where said means for maintaining a substantially constant reference force on said load cell includes a loading bolt collar member surrounding said loading bolt member and captured between a lower surface of said common plate member and an upper surface of said load cell.

9. The load cell temperature compensation system as recited in claim 8 where said loading bolt collar member passes through an opening formed through said load cell mounting plate member, said opening having a diameter substantially greater than a diameter of said loading bolt collar member.

10. The load cell temperature compensation system as recited in claim 6 where said means for maintaining a substantially constant reference force on said load cell includes at least one load coupling collar member surrounding said load coupling member and captured between a lower surface of said common plate member and an upper surface of said bottom plate member.

11. The load cell temperature compensation system as recited in claim 10 where said load coupling collar member passes through an opening formed in said load cell mounting plate member, said opening having a diameter substantially greater than a diameter of said load coupling collar member.

12. The load cell temperature compensation system as recited in claim 10 where each of said load coupling collar member and said loading bolt collar member are formed of inter-related predetermined material compositions and include extended predetermined lengths to provide a substantially equal change in length responsive to temperature variations.

13. The load cell temperature compensation system as recited in claim 12 where said load coupling collar member and said loading bolt collar member are inter-related in substantial accordance with the formula:

$$\alpha_1/\alpha_2 = l_2/l_1$$

where:
$\alpha_1$ = temperature coefficient of expansion of said load coupling collar member
$l_1$ = length of said load coupling collar member
$\alpha_2$ = temperature coefficient of expansion of said loading bolt collar member
$l_2$ = length of said loading bolt collar member 14. A load cell temperature compensation system comprising:

(a) a load cell having a predetermined extended length and temperature coefficient of expansion;

(b) a load cell mounting plate member fixedly secured to an external base member adapted to have an external force load applied thereto, said load cell being fixedly secured to said load cell mounting plate member; and, (c) means for applying a force load to said load cell responsive to said external force load applied to said base member, said force load applying means having a predetermined length and temperature coefficient of expansion for maintaining a substantially constant reference load force on said load cell independent of temperature variations applied to said base member, said means for applying said force load including a loading plate member rigidly secured to said base member and a loading bolt member fixedly secured to said loading plate member and said load cell on opposing ends thereof.

15. The load cell temperature compensation system as recited in claim 14 where said loading plate member is displaced from said load cell mounting plate member.

16. The load cell temperature compensation system as recited in claim 14 where said load cell is mounted between said loading plate member and said load cell mounting plate member.

17. The load cell temperature compensation system as recited in claim 16 where said loading bolt member is threadedly secured to said loading plate member and secured to said load cell on opposing ends thereof.

18. The load cell temperature compensation system as recited in claim 14 where said loading bolt member extends through said load cell within a passage formed through said load cell, at least a portion of said passage having a diameter greater than a diameter of said loading bolt member.

19. The load cell temperature compensation system as recited in claim 14 including a thermal isolation member removably secured to said load cell and said load cell mounting plate member for thermally isolating said load cell from said load cell mounting plate member.

20. The load cell temperature compensation system as recited in claim 19 where said thermal isolation member is sandwiched between said load cell and said load cell mounting plate member.

21. The load cell temperature compensation system as recited in claim 20 where said thermal isolation member is threadedly secured to said load cell and said load cell mounting plate member.

22. The load cell temperature compensation system as recited in claim 20 where said thermal isolation member includes a thermal conductivity less than a thermal conductivity of said load cell and said load cell mounting plate member.

23. The load cell temperature compensation system as recited in claim 22 including an isolation cap member threadedly secured to said thermal isolation member.

24. The load cell temperature compensation system as recited in claim 14 where said load cell and said loading bolt member are inter-related in substantial accordance with the formula:

$$\alpha_3/\alpha_4 = l_4/l_3$$

where:
- $\alpha_3$ = temperature coefficient of expansion of said load cell
- $\alpha_4$ = temperature coefficient of expansion of said loading bolt member
- $l_3$ = length of said load cell
- $l_4$ = length of said loading bolt member

* * * * *